US012812039B2

(12) United States Patent
Snapp

(10) Patent No.: US 12,812,039 B2
(45) Date of Patent: Nov. 24, 2026

(54) GROSS LOCATION ROUTING FOR 988 SYSTEMS

(71) Applicant: Intrado Life & Safety, Inc., Longmont, CO (US)

(72) Inventor: John Lawrence Snapp, Everett, WA (US)

(73) Assignee: Intrado Life & Safety, Inc., Longmont, CO (US)

( * ) Notice: Subject to any disclaimer, the term of this patent is extended or adjusted under 35 U.S.C. 154(b) by 289 days.

(21) Appl. No.: 18/618,781

(22) Filed: Mar. 27, 2024

(65) Prior Publication Data

US 2025/0080650 A1 Mar. 6, 2025

Related U.S. Application Data

(60) Provisional application No. 63/535,222, filed on Aug. 29, 2023.

(51) Int. Cl.
*H04M 3/51* (2006.01)
*H04M 3/523* (2006.01)

(52) U.S. Cl.
CPC ......... *H04M 3/5116* (2013.01); *H04M 3/523* (2013.01)

(58) Field of Classification Search
CPC ............................ H04M 3/5116; H04M 3/523
USPC ....................................................... 455/404.1
See application file for complete search history.

(56) References Cited

U.S. PATENT DOCUMENTS

2004/0190497 A1* 9/2004 Knox .................. H04M 7/1285 370/352
2009/0165039 A1* 6/2009 Soo .................... H04N 21/4722 725/35
2023/0049959 A1* 2/2023 Schroeder ........... G06F 3/04817

* cited by examiner

*Primary Examiner* — Maria El-Zoobi
(74) *Attorney, Agent, or Firm* — PATENT CAPITAL GROUP

(57) ABSTRACT

There is disclosed in one example, a computer-implemented method of routing an emergency communication, comprising: receiving an incoming emergency communication from a mobile device, the incoming emergency communication connected via a mobile communication site; determining an approximate or exact geographic location of the mobile communication site; identifying a geographical telephone boundary that contains geographic location of the mobile communication site; selecting a numbering plan area (NPA) and prefix associated with the geographical telephone boundary; assigning, to the emergency communication, a North American Numbering Plan (NANP) telephone number with an NPA and prefix that match the selected NPA and prefix, wherein the NANP telephone number is different from a telephone number of the mobile device; attaching the assigned NANP telephone number to a network packet; and forwarding the network packet to a service center to handle the emergency communication.

20 Claims, 13 Drawing Sheets

GROSS LOCATION ROUTING FOR 988 SYSTEMS

PRIORITY APPLICATION

This Application claims the benefit of priority to U.S. Provisional Application No. 63/535,222, titled "988 CALL ROUTING SYSTEM AND METHOD," filed Aug. 29, 2023, the contents of which is hereby incorporated by reference in its entirety.

FIELD OF THE SPECIFICATION

This application relates in general to computer security, and more particularly though not exclusively to a system and method for gross location routing for 988.

BACKGROUND

In or around 2020, the Federal Communications Commission (FCC) designated "988" as a nationwide standard three-digit number for mental health crises and suicide prevention. Most Americans were already familiar with 911, which they could call for emergency assistance with medical trauma or crimes. The 988 number is familiar and easy to remember and provides a valuable service for those at risk of harming themselves or others.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
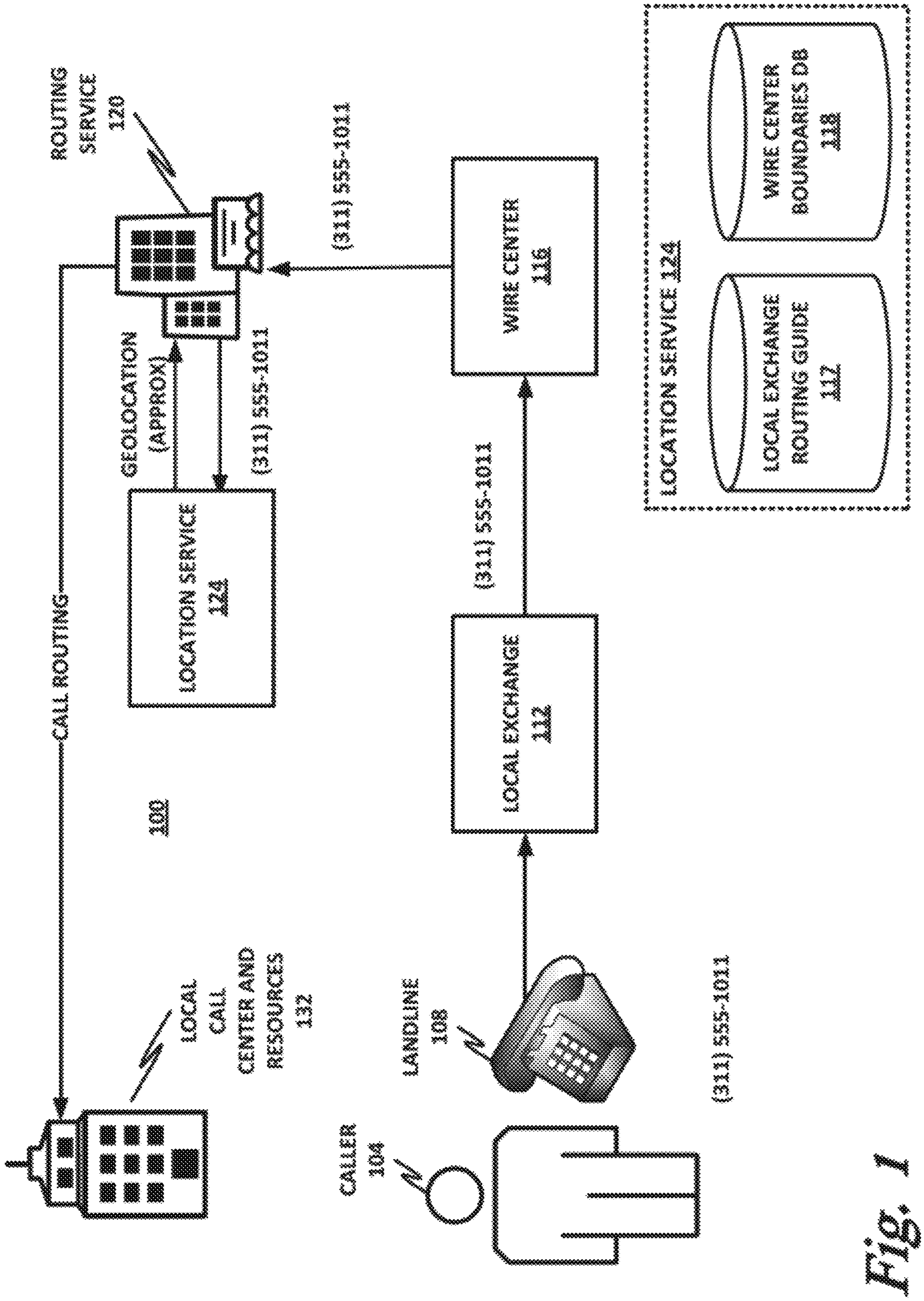
FIG. 1 is a block diagram of selected elements of a wireline 988 routing system.

There is disclosed in one example, a computer-implemented method of routing an emergency communication, comprising: receiving an incoming emergency communication from a mobile device, the incoming emergency communication connected via a mobile communication site; determining an approximate or exact geographic location of the mobile communication site; identifying a geographical telephone boundary that contains geographic location of the mobile communication site; selecting a numbering plan area (NPA) and prefix associated with the geographical telephone boundary; assigning, to the emergency communication, a North American Numbering Plan (NANP) telephone number with an NPA and prefix that match the selected NPA and prefix, wherein the NANP telephone number is different from a telephone number of the mobile device; attaching the assigned NANP telephone number to a network packet; and forwarding the network packet to a service center to handle the emergency communication.

Embodiments of the Disclosure

Overview

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The 988 Suicide & Crisis Lifeline (formerly known as the National Suicide Prevention Lifeline) offers 24/7 call, text, and chat access to trained crisis counselors who can help people experiencing suicidal, substance use, and/or mental health crises, or any other kind of emotional distress. People can also dial 988 if they are worried about a loved one who may need crisis support.

Callers can reach 988 via voice over internet protocol (VoIP), landline, and/or wireless telephones. They can also reach 988 via text on a mobile phone. 988 has many centers around the country that provide general or local help. When a user calls 988, one important function is to route the call to the best available 988 crisis center. There are many crisis centers around the nation, and although 988 does not have the same sensitivity to exact location as 911, for example, routing the caller to an appropriate call center may still be important. For example, when a user calls 911, emergency services may need to be dispatched to the exact location. Thus, per federal regulation, 911 routing services have access to very precise location data, which may be used to dispatch police, emergency medical technicians (EMTs), or others to the location.

When a user calls 988, however, location needs may be different. Because 988 can contain sensitive mental health information, they may be subject to state and/or federal medical privacy laws. Furthermore, in most cases, there is no need to immediately dispatch emergency services in response to a 988 call. Rather, the goal is to connect the caller with an appropriate counselor, who can help to diffuse an immediate crisis and connect the caller with additional long-term assistance. Thus, while the user's precise geolocation is not necessary in all cases, it may be desirable to identify an approximate geolocation, so that the responder can access local knowledge and resources to respond to long-term needs.

In current practice, when a user calls 988, the call is routed to a 988 center that covers the local rate center of the phone number making the call. For example, if a user dials with the number 308-810-0001, the user is connected to a Denver, CO call center because the 303-810 rate center is in Denver, CO. This call center may have local knowledge of Denver, CO resources. While this can be beneficial if the user calls from Denver, CO, the modern practice of phone number portability makes that geographic assumption increasingly unreliable. A person with a 303 phone number today may not have lived in Denver for many years, if ever.

Thus, if a person with the number 303-810-xxxx calls 988 from downtown Seattle, WA, it may be preferable to route the call to a call center local to or near Seattle, WA. That call center may have superior local knowledge of Seattle, and may be better positioned to connect the caller with resources in the Seattle area.

The present specification provides a system and method to connect a 988 caller to a call center based not on the assigned phone number of the device, but rather based on a location of the cell tower the user connects to. Exact precision is not required for 988 calls, and may not even be desirable. Furthermore, 988 infrastructure is largely an extension of existing 911 infrastructure, and thus the extant hardware and software is built to route and handle calls based on a ten-digit phone number from the North American Numbering Plan (NANP).

Because a landline is associated with a single physical address or location, when a user calls 911 or 988 from a landline, the call center can immediately associate the call with a physical location, based on the physical address. Under the NANP, a phone number may comprise three segments: a numbering plan area (NPA) (also called an area code), a prefix (also sometimes called an exchange code or central office code), and an individual line number. A phone number may also include a country code (e.g., +1 for the United States), but because 988 is a national-level service, the examples here treat all numbers as originating from the "+1" country code. However, the principles taught herein can be adapted to also provide country-level routing.

An example phone number may be:

(591) 555-0123

In this example, "591" is a fictional area code. The area code represents a broad geographic region that the number may be associated with (such as a metropolitan area, or a rural zone). Currently, the NANP does not assign area codes with "9" as the second digit, so 591 is a fictional area code.

For many years, the NANP also reserved the prefix or exchange "555" as unused, which made it available for fictional or example phone numbers without colliding with any real phone numbers. More recently, as some area codes faced telephone number exhaustion, 555-prefixed numbers have been used. Currently, numbers in the range 555-0100 to 555-0199 are reserved. However, 555-style numbers outside this range are still commonly used for fictional phone numbers.

Historically, the prefix would identify a specific exchange or central office that was expected to handle calls associated with a particular landline. Thus, the prefix usually identified a geographic zone smaller than the rate center, which is usually smaller than the area code.

Finally, the line number was associated with a particular subscriber at a given geographic location. Thus, with historical landlines, a ten-digit phone number could reliably identify a specific location, such as a place of business or a household. Specific locations are key data for 911 calls, as emergency responders need to be quickly directed to the scene of the emergency. In modern practice, as mobile telephones have overtaken land lines, additional data are associated with 911 calls. For example, a cellular device with its location services turned on can self-identify with a high degree of spatial accuracy (e.g., within about a meter). Even if location services are not available, other information such as triangulation with multiple cell towers can be used to derive location data.

In 988 services, different considerations may arise. For example, 988 does not respond to an immediate physical emergency, but rather provides guidance to help with a mental health emergency. Those with mental health emergencies, and particularly those facing a suicide crisis, may be embarrassed, ashamed, or otherwise hesitant to reach out. One important feature of the 988 service is the preservation of privacy, and where the caller prefers, even anonymity. Failure to protect privacy may result in users hesitating to use the service, thus defeating its purpose. So by design, current 988 services do not access the user's precise location via global positioning system (GPS) or via triangulation.

For those staffing a 988 call center, a key consideration may be to provide immediate crisis counseling (e.g., to "talk down" someone who is on the verge of suicide), and then to refer the caller to local professional services that can provide longer-term care. To this end, 988 call centers are often staffed by people with local knowledge. While it may not be necessary to route emergency first responders to the caller's immediate location, it may be important to provide the caller with relevant and local information. For example, many users' cell phone numbers are simply artifacts of where they lived when they first procured mobile services. Thus, a person who grew up in California and currently resides in New York may still have a California phone number. If the user's 988 call is routed to a California call center, California-based counselors may be able to address immediate concerns or "talk the caller down." But they may be ill-equipped to direct the caller to local New York-based services.

In lieu of precise location services, the present method infers a gross location for the caller. The gross location is a location that need not be accurate on the level of feet or meters, but may be accurate to the scale of miles or even a few tens of miles. In general, a gross location is a location that is accurate on a scale of between one-half a mile and 50 miles, and more specifically in the range of one mile to 25 miles or one mile to 10 miles. This range is useful because callers may be willing to travel a distance of about 10 to 25 miles or less to receive services, but are often not willing to travel further than that. Thus, it is beneficial to locate the user on a resolution of less than 25 miles, but greater than one-half mile to preserve user privacy and/or anonymity.

Various data sources may be used to infer a user's gross location. For example, depending on population density and terrain, cell towers are often spaced at less than 25 miles. In densely-populated urban environments, cell towers may be as little as one-quarter to one-half mile apart. In suburban areas, they may be spaced on the order of one to two miles. In low-density urban areas with flat terrain and good lines of sight, towers may be spaced tens of miles apart (e.g., 30 to 40 miles in some cases). Thus, in many cases, identifying the cell site that handles a call may be sufficient to identify the caller's location for call center routing purposes. Indeed, in some instances, locating the cell tower may be too precise, and it may be desirable to obfuscate or generalize the caller's location to some degree.

Advantageously, call centers with legacy software that handle 911 calls already have in-place infrastructure and software to route calls to different call centers. Because these legacy systems are based on the older assumption of land lines, and because the geography of land lines fits within the desired resolution of the present specification, the existing infrastructure can be used to provide gross location information for calls. In an example, a service provider that handles a 988 call has access to an identifier for a cell tower or site that originated a call. The service provider may have an in-place agreement with the cellular operator, or may have access to a crowd-sourced or other database of location information for cell sites. The service provider may lookup the user's gross location information based on the connecting cell tower, and may then identify a wire center or rate center that contains the cell site or tower. Wire centers and rate centers are well-known geographic shapes that remain static over long times, in part because of federal regulations. Thus, the rate center or wire center for a cell tower will change infrequently, if at all, and can be a reliable proxy for a gross location. Each rate center or wire center usually has a single area code, though in modern practice, some area codes overlap, particularly in densely-populated urban centers. The rate center or wire center may also provide some number of prefixes, on the order of tens to approximately 100 prefixes.

For 988 purposes, any telephone number within the rate center or wire center may be sufficient to provide a gross location of the caller. Thus, a gateway mobile location center (GMLC) may receive the call, and may identify the correct geoboundary (e.g., a rate center or wire center). The GMLC may select the area code (or choose from between two or more overlapping area codes), choose a prefix, and assign a four-digit line number. In one example, the assigned four-digit line number is fixed as the first line number in the selected exchange. This may be "0000," although other combinations are possible, as some rate centers divide prefixes (especially in sparsely-populated rural areas). Thus, for example, if the geoboundary uses line numbers in the range 4000-9999, the GMLC may select 4000 instead of 0000. The GMLC may also use any other fixed or random number in the appropriate range. The selected number may correspond to a real phone number belonging to somebody who is not the caller. However, this may be acceptable because this number is not used to uniquely identify the caller, but rather to provide a gross location for the caller. The constructed 10-digit number may be attached to the call data as a special or extra header, and then forwarded to a call routing service. With little modification, the call routing service can use the constructed phone number to forward the call to an appropriate call center.

The call center that handles the 988 call may understand that the header phone number is not the user's true phone number. However, the phone number may work well with existing infrastructure that routes calls to different call centers based on the caller's phone number. In some systems, the area code and prefix are already used to determine a gross location for the user, to ensure that the call is routed to the correct call center (e.g., in legacy 911 systems, the operator may need to know which first responder precinct to contact to handle the emergency). A precinct-grade location may be sufficient to provide correct call routing, while also preserving the caller's privacy.

Although the foregoing is described in terms of routing 988 calls, the method may also be adapted for other types of mobile transaction. For example, 911 calls may use the method in cases where device location data are not available.

In other contexts, user privacy in online transactions is also a major issue in the modern network, and is a frequent subject of laws and regulations at many levels of government. Many online retailers request access to precise GPS coordinates for users for purposes of connecting users to local resources (e.g., the closest "brick and mortar" location), or service centers. Where users are concerned about privacy, a generated phone number in an extra header may be sufficient to direct users to a nearby retail store, call center, or service center, without requiring precise GPS coordinates with ensuing privacy concerns. Thus, the system and method disclosed are useful in the context of online shopping, purchase of airline or other transit tickets, and call centers that handle service calls for repairs for vehicles, appliances, homes, or other products, all by way of illustrative and nonlimiting example. In general, the method is useful in any context where it is desirable to route mobile transactions, including phone calls, to a call center that has local capability, or to provide geographical context, where it is not necessary to know a precise (e.g., meter-scale) location of the caller.

Furthermore, this method provides a mechanism to assign geographical based caller routing to 988 call that can fit into the existing telephone number-based routing and allow routing to possible new independent 988 centers.

The method provides routing for wireless/mobile telephone calls, as well as VOIP calls, text messages, or other communications and transactions that connect to a mobile network. The call may be converted into a gateway location center, such as a GMLC or similar device. The GMLC receives coarse location from the device (e.g., a geospatial location, precise latitude/longitude, or GPS coordinates of the handling cell site/cell tower, which may be referred to as a "cell x,y"). Alternatively, the GMLC may query an external device, such as a Dynamic Automatic Location Identification (DALI), E-CellID serving mobile location center (eSMLC), etc) or other data source for a coarse location. It may then query a geospatial database with the obtained location to determine a destination code to route the call. This destination code could be one of several identifiers.

a. The actual PSTN dialable phone number of a 988 center that covers a shape within the geoboundary.
b. A code defining a regional area that the call is being placed from, such as a county or city. A federal information processing standard (FIPS) code or similar code could be returned.
c. Return a geographically-relevant phone number (an automatic number identification (ANI)). This may not be the actual phone number of the device the user called on, and in some cases, it is specifically preferable for it to not be the actual phone number. This may be referred to as a geographic ANI (G-ANI). The G-ANI may be included, for example, in a session initiation protocol (SIP) header in an extra ("X") field. The G-ANI may be used in place of the actual phone number for routing. If the G-ANI is not included, the system may use the ANI to route the call. This provides a default mode, wherein, in cases where the G-ANI is not available for any reason, the system reverts to legacy processing, and routes the call to a service center according to their actual phone number.

In an illustrative example, a SIP invitation may contain information such as the following:

```
INVITE sip:8002738255@2.2.2.2:5060 SIP/2.0
Allow: INVITE, ACK, CANCEL, BYE, PRACK, OPTIONS
Session-Expires: 1800
To: <sip:8002738255@2.2.2.2:5060>
From: <sip:bbbbbbbbbbb@1.1.1.1:5065>;tag=gK00039776
Via: SIP/2.0/UDP 1.1.1.1:5065
Accept: application/sdp
CSeq: 771622 INVITE
X-988: cccd...ddd
Min-SE: 90
Call-ID: 16810509_132045981@1.1.1.1
Max-Forwards: 69
Supported: timer, 100rel, precondition
Contact: sip:bbbbbbbbbbb@1.1.1.1:5065
Content-Type: application/sdp
Content-Length: 180
v=0
o=Sonus_UAC 657209 962197 IN IP4 1.1.1.1
s=SIP Media Capabilities
c=IN IP4 1.1.1.1
t=0 0
m=audio 25720 RTP/AVP 0
a=rtpmap:0 PCMU/8000
a=sendrecv
a=maxptime:20
```

Where "bbbbbbbbbbb" may be the E.164 phone number of the mobile caller (e.g., 13038100600, or +1 (303) 810-0600). The X Header may be defined as the destination code. An illustrative X header may include the following:

The X Header of "x-999" defines the destination code and may comprise the following digits:

a. ccc - 3 digit code defining what type of destination code follows in the d..ddd digits:
   i. 988 - The destination code uses a FIPS coding where the code is 988ssccc:
      1. 988 - Identifies x header as being FIPS code format
      2. ss - 2-digit state identifier
      3. ccc - 3-digit county identifier
   ii. 999 - The destination code uses a RATE center coding where the code is 999NPANXX0000:
      1. 999 - Identifies x header as being Rate center format
      2. NPA - 3 digit identifier of NPA within rate center
      3. NXX - 3 digit identifier of NXX within rate center
      4. 0000 - last 4 digits (e.g., 0000 or the first number in the exchange) of the line number within the NXX. This may also be auto-generated, randomized, or some other fixed value.
   iii. 998 - The destination code uses a custom shape file where the code is 998sssjjjj
      1. 998 - Identifies x header as being custom shape file
      2. sss - 2-digit identifier of defining jurisdiction or state
      3. jjjj - 4-digit shape id
   iv. xxx - [Reserved for future destination codes]

Thus, a destination code using a rate center, may appear as follows:

X-988: 999NPANXX0000

For example, if a 988 call was placed from a cell within the Everett, WA rate center, the following X header may be returned:

X-988: 9994252520000

This provides a G-ANI of +1 (425) 252-0000, where the country code+1 is implied. Again, this may be, and may generally be expected to be, different from an actual phone number (ANI) assigned to the mobile device the caller operates. The real ANI may also be provided outside of the X header, for other purposes (e.g., caller ID, such as to enable a call-back as necessary).

Selected Examples

The subject matter of the present specification may be understood in the context of several selected examples. These examples are nonexclusive, and other embodiments are also available.

There is disclosed in one example, a computer-implemented method of routing an emergency communication, comprising: receiving an incoming emergency communication from a mobile device, the incoming emergency communication connected via a mobile communication site; determining an approximate or exact geographic location of the mobile communication site; identifying a geographical telephone boundary that contains geographic location of the mobile communication site; selecting a numbering plan area (NPA) and prefix associated with the geographical telephone boundary; assigning, to the emergency communication, a North American Numbering Plan (NANP) telephone number with an NPA and prefix that match the selected NPA and prefix, wherein the NANP telephone number is different from a telephone number of the mobile device; attaching the assigned NANP telephone number to a network packet; and forwarding the network packet to a service center to handle the emergency communication.

There is further disclosed an example, wherein the mobile communication site is a cellular telephone site.

There is further disclosed an example, wherein the geographic telephone boundary comprises a rate center.

There is further disclosed an example, wherein determining an approximate or exact geographic location of the mobile communication site comprises querying a crowd-sourced or third-party database of mobile communication site locations.

There is further disclosed an example, wherein the geographic telephone boundary comprises a legacy wire center for a public switched telephone network (PSTN).

There is further disclosed an example, wherein selecting the prefix comprises selecting the prefix from a plurality of prefixes of the geographical telephone boundary.

There is further disclosed an example, wherein selecting the prefix comprises selecting a prefix of a nearest telephone exchange to the mobile communication site.

There is further disclosed an example, wherein selecting the prefix comprises selecting a random prefix from a plurality of prefixes of the geographical telephone boundary.

There is further disclosed an example, wherein selecting the NPA comprises selecting an area code from at least two area codes for the geographical telephone boundary.

There is further disclosed an example, wherein assigning the NANP telephone number comprises assigning a random line number with the selected NPA and prefix.

There is further disclosed an example, wherein assigning the NANP telephone number comprises assigning a reserved line number with the selected NPA and prefix.

There is further disclosed an example, wherein assigning the NANP telephone number comprises assigning a fixed line number with the selected NPA and prefix.

There is further disclosed an example, wherein the fixed line number is a first line number in a range assigned to the geographical telephone boundary for the selected NPA and prefix.

There is further disclosed an example, wherein the emergency communication is an emergency telephone call.

There is further disclosed an example, wherein the emergency communication is a call to a suicide crisis hotline.

There is further disclosed an example, wherein the emergency communication is a 988 call.

There is further disclosed an example, further comprising attaching the assigned NANP telephone number to an extra header of the network packet.

There is further disclosed an example, further comprising attaching a real NANP telephone number of the mobile device to the network packet.

There is further disclosed an example of an apparatus comprising means for performing the method.

There is further disclosed an example, wherein the means for performing the method comprise a processor and a memory.

There is further disclosed an example, wherein the memory comprises machine-readable instructions that, when executed, cause the apparatus to perform the method.

There is further disclosed an example, wherein the apparatus is a computing system.

There is further disclosed an example of at least one computer readable medium comprising instructions that, when executed, implement a method or realize an apparatus as described.

There is further disclosed an example of one or more tangible, nontransitory computer-readable storage media having stored thereon executable instructions to instruct a processor to: receive an incoming emergency communication from a mobile device, the incoming emergency communication connected via a mobile communication site; determining an approximate or exact geographic location of the mobile communication site; identifying a geographical telephone boundary that contains geographic location of the mobile communication site; selecting a numbering plan area (NPA) and prefix associated with the geographical telephone boundary; assigning, to the emergency communication, a North American Numbering Plan (NANP) telephone number with an NPA and prefix that match the selected NPA and prefix, wherein the NANP telephone number is different from a telephone number of the mobile device; attaching the assigned NANP telephone number to a network packet; and forwarding the network packet to a service center to handle the emergency communication.

There is further disclosed an example, wherein the mobile communication site is a cellular telephone site.

There is further disclosed an example, wherein the geographic telephone boundary comprises a rate center.

There is further disclosed an example, wherein determining an approximate or exact geographic location of the mobile communication site comprises querying a crowd-sourced or third-party database of mobile communication site locations.

There is further disclosed an example, wherein the geographic telephone boundary comprises a legacy wire center for a public switched telephone network (PSTN).

There is further disclosed an example, wherein selecting the prefix comprises selecting the prefix from a plurality of prefixes of the geographical telephone boundary.

There is further disclosed an example, wherein selecting the prefix comprises selecting a prefix of a nearest telephone exchange to the mobile communication site.

There is further disclosed an example, wherein selecting the prefix comprises selecting a random prefix from a plurality of prefixes of the geographical telephone boundary.

There is further disclosed an example, wherein selecting the NPA comprises selecting an area code from at least two area codes for the geographical telephone boundary.

There is further disclosed an example, wherein assigning the NANP telephone number comprises assigning a random line number with the selected NPA and prefix.

There is further disclosed an example, wherein assigning the NANP telephone number comprises assigning a reserved line number with the selected NPA and prefix.

There is further disclosed an example, wherein the reserved line number is a first line number in a range assigned to the geographical telephone boundary for the selected NPA and prefix.

There is further disclosed an example, wherein assigning the NANP telephone number comprises assigning a fixed line number with the selected NPA and prefix.

There is further disclosed an example, wherein the emergency communication is an emergency telephone call.

There is further disclosed an example, wherein the emergency communication is a call to a suicide crisis hotline.

There is further disclosed an example, wherein the emergency communication is a 988 call.

There is further disclosed an example, further comprising attaching the assigned NANP telephone number to an extra header of the network packet.

There is further disclosed an example, further comprising attaching a real NANP telephone number of the mobile device to the network packet.

There is further disclosed an example of a gateway mobile location center (GMLC) apparatus, comprising: a hardware platform, comprising a processor circuit and a memory; and instructions encoded within the memory to instruct the processor circuit to: receive an incoming emergency communication from a mobile device, the incoming emergency communication connected via a mobile communication site; determining an approximate or exact geographic location of the mobile communication site; identifying a geographical telephone boundary that contains geographic location of the mobile communication site; selecting a numbering plan area (NPA) and prefix associated with the geographical telephone boundary; assigning, to the emergency communication, a North American Numbering Plan (NANP) telephone number with an NPA and prefix that match the selected NPA and prefix, wherein the NANP telephone number is different from a telephone number of the mobile device; attaching the assigned NANP telephone number to a network packet; and forwarding the network packet to a service center to handle the emergency communication.

There is further disclosed an example, wherein the mobile communication site is a cellular telephone site.

There is further disclosed an example, wherein the geographic telephone boundary comprises a rate center.

There is further disclosed an example, wherein determining an approximate or exact geographic location of the mobile communication site comprises querying a crowd-sourced or third-party database of mobile communication site locations.

There is further disclosed an example, wherein the geographic telephone boundary comprises a legacy wire center for a public switched telephone network (PSTN).

There is further disclosed an example, wherein selecting the prefix comprises selecting the prefix from a plurality of prefixes of the geographical telephone boundary.

There is further disclosed an example, wherein selecting the prefix comprises selecting a prefix of a nearest telephone exchange to the mobile communication site.

There is further disclosed an example, wherein selecting the prefix comprises selecting a random prefix from a plurality of prefixes of the geographical telephone boundary.

There is further disclosed an example, wherein selecting the NPA comprises selecting an area code from at least two area codes for the geographical telephone boundary.

There is further disclosed an example, wherein assigning the NANP telephone number comprises assigning a random line number with the selected NPA and prefix.

There is further disclosed an example, wherein assigning the NANP telephone number comprises assigning a reserved line number with the selected NPA and prefix.

There is further disclosed an example, wherein the reserved line number is a first line number in a range assigned to the geographical telephone boundary for the selected NPA and prefix.

There is further disclosed an example, wherein assigning the NANP telephone number comprises assigning a fixed line number with the selected NPA and prefix.

There is further disclosed an example, wherein the emergency communication is an emergency telephone call.

There is further disclosed an example, wherein the emergency communication is a call to a suicide crisis hotline.

There is further disclosed an example, wherein the emergency communication is a 988 call.

There is further disclosed an example, further comprising attaching the assigned NANP telephone number to an extra header of the network packet.

There is further disclosed an example, further comprising attaching a real NANP telephone number of the mobile device to the network packet.

There is further disclosed an example of a computer-implemented method of associating a mobile transaction with a geographic situs, comprising: identifying a mobile device and a cell site that originated the mobile transaction; selecting a selected geographical shape from a set of mutually-exclusive geographical shapes, wherein the selected geographical shape contains the cell site; determining an area code and prefix contained with the geographical shape; assigning an assigned telephone number to the mobile transaction, wherein the assigned telephone number includes the determined area code and prefix, and is different from a real telephone number of the mobile device; and attaching the assigned telephone number to an extra header for a service center that substantively handles the mobile transaction.

There is further disclosed an example, wherein the geographic shape comprises a rate center.

There is further disclosed an example, wherein the geographic shape comprises a legacy wire center for a public switched telephone network (PSTN).

There is further disclosed an example, wherein the determined area code and prefix are selected from a plurality of area codes and/or prefixes of the selected geographical shape.

There is further disclosed an example, wherein the determined area code and prefix are an area code and prefix of a nearest telephone exchange to the cell site.

There is further disclosed an example, wherein the determined area code and prefix comprise a random prefix from a plurality of prefixes of the geographical shape.

There is further disclosed an example, wherein the determined area code and prefix comprise a fixed prefix from a plurality of prefixes of the geographical shape.

There is further disclosed an example, wherein the determined area code and prefix comprise an area code selected from at least two area codes of the geographical shape.

There is further disclosed an example, wherein assigning the assigned telephone number comprises assigning a random line number with the determined area code and prefix.

There is further disclosed an example, wherein assigning the assigned telephone number comprises assigning a reserved line number with the determined area code and prefix.

There is further disclosed an example, wherein assigning the assigned telephone number comprises assigning a fixed line number with the determined area code and prefix.

There is further disclosed an example, wherein the mobile transaction is an emergency telephone call.

There is further disclosed an example, wherein the mobile transaction is a call to a suicide crisis hotline.

There is further disclosed an example, wherein the mobile transaction is a 988 call.

There is further disclosed an example, wherein the mobile transaction is a commercial transaction.

There is further disclosed an example, further comprising attaching the real telephone number of the mobile device to a header for the service center.

There is further disclosed an example of an apparatus comprising means for performing the method.

There is further disclosed an example, wherein the means for performing the method comprise a processor and a memory.

There is further disclosed an example, wherein the memory comprises machine-readable instructions that, when executed, cause the apparatus to perform the method.

There is further disclosed an example, wherein the apparatus is a computing system.

There is further disclosed an example of at least one computer readable medium comprising instructions that, when executed, implement a method or realize an apparatus as described.

DETAILED DESCRIPTION OF THE DRAWINGS

A system and method for 988 call routing will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of selected elements of a wireline 988 call routing system. Call routing system 100 includes a caller 104 operating a landline 108, although the teachings are also applicable to wireless and VOIP calls (in which case the network handles the call routing based on ANI phone number). Caller 104 has an NAI or telephone number associated with landline 108. In this illustrative example, the NAI (311) 555-1011 is used. 311 is the area code, also known as the numbering plan area (NPA) within the NANP system. The digits 555 are a prefix, which may be associated with a local exchange 112. The digits 1011 are a line number that uniquely identify landline 108 within local exchange 112. Because landline 108 is effectively geographically fixed, the NAI 311-555-1011 can act not only to route telephone calls, but also as an effective geolocation for caller 104.

Caller 104 may call 988 to receive suicide crisis aid, drug abuse counseling, or mental health emergency services. The call is routed via a wire center 116. Wire center 116 is a geographic region that may include one or more end offices, switches, and/or local exchanges. Historically, an end office covered a single wire center area, although as telephone infrastructure has evolved, that may no longer be true. In a traditional wire center, all telephone lines within the wire center connect back to a central switch (e.g., an end office, switch, or local exchange). In modern usage, local exchange 112 and wire center 116 may have more significance for call routing than as physical network architecture. Thus, local exchange 112 and wire center 116 should be understood as logical blocks more than as physical locations.

By way of illustration, wire center 116 may include a plurality of local exchanges 112, such as tens of exchanges in more densely populated urban areas. In some cases, wire center 116 may include more than 100 local exchanges 112.

Wire center 116 routes the telephone call to routing service 120. Routing service 120 is responsible for directing the 988 call to an appropriate local call center 132, which provides resources and has local knowledge relevant to the physical location of caller 104. To select the correct local call center 132, routing service 120 may query a location service 124.

Routing service 120 provides the NAI to location service 124. Location service 124 may have access to databases such as local exchange routing guide 117 and a wire center boundaries database 118. Wire center boundaries database 118 includes geographic maps of wire centers 116, and can correlate those geographic boundaries to appropriate call centers and resources 132. This routing may include selecting a nearest local call center 132, although other rules may also be used. For example, in some cases certain call centers have limited business hours, and after-hours calls may be routed to an auxiliary call center.

Based on the NAI, location service 124 returns to routing service 120 an approximate geographic location for caller 104, and routing service 120 may then route the 988 call to local call center 132. This may include, for example, converting the call into a toll-free 800-number call, which is directed to the appropriate call center 132. Caller 104 can then speak with trained service agents within call center 132 and receive critical and lifesaving support for suicide prevention, substance abuse counseling, and other mental health crises.

Much of the infrastructure of routing service 120 and location service 124 is based on the assumption that a given phone number can be associated with a physical location, and that a given prefix can be mapped to a broader gross location. However, in modern practice, a majority of consumer telephones are mobile telephones, so those geographically static assumptions are not always valid. However, according to federal, state, and local regulations, local exchange routing guides 117 and wire center boundaries databases 118 are still maintained to correlate NAIs to particular geographic locations.

Figure 2:
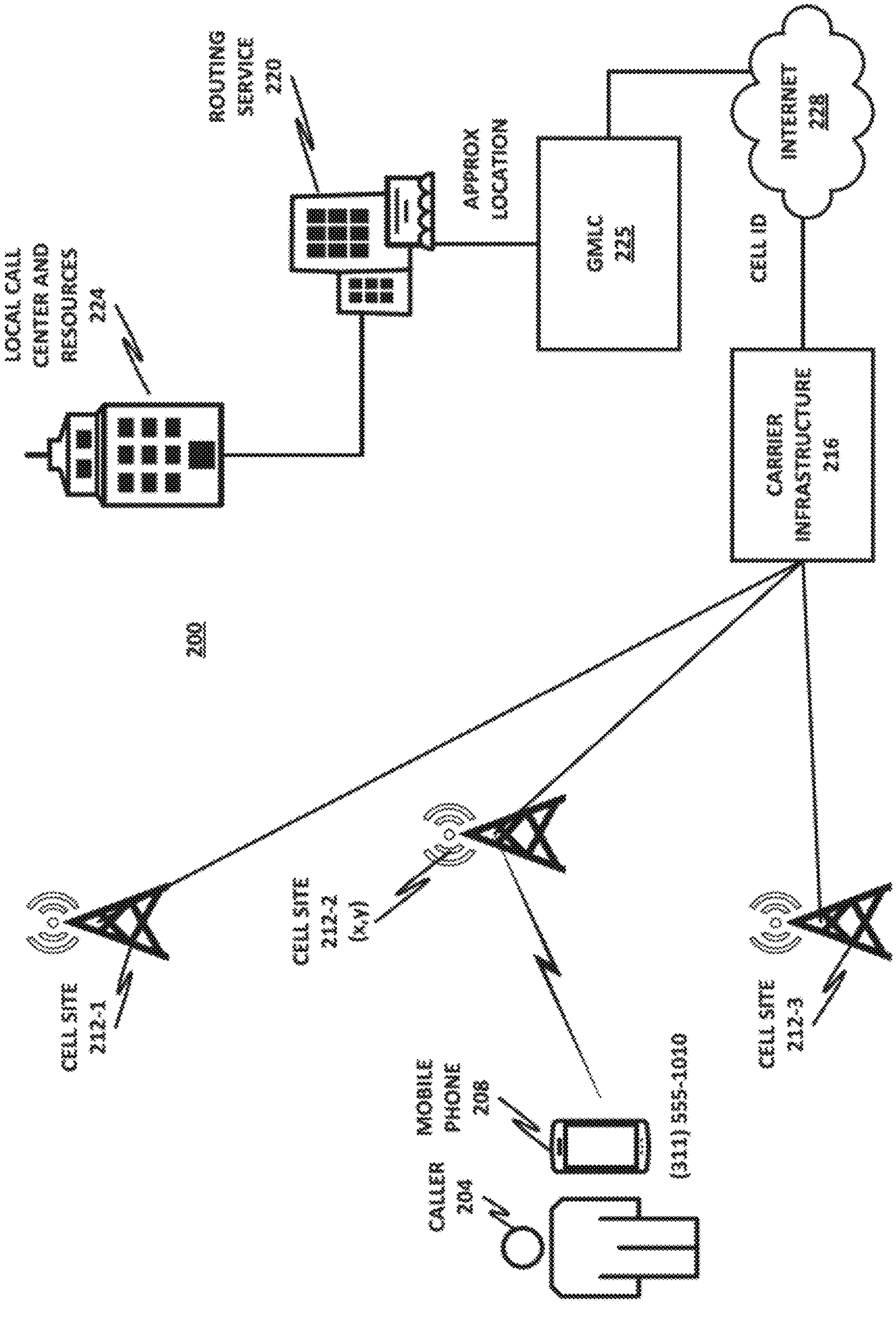
FIG. 2 is a block diagram of selected elements of a wireless 988 routing system.

FIG. 2 is a block diagram illustration of selected elements of a wireless communication network 200. Within wireless communication network 200, caller 204 operates mobile phone 208 to access 988 counseling services.

Within mobile network 200, a plurality of cell sites 212 may handle mobile telephone calls. In this illustration, cell sites 212-1, 212-2, and 212-3 are illustrated, although many more cell sites are generally seen in a mobile network. Cell sites 212 may be owned and operated by a specific wireless carrier, and in some cases carriers may lease bandwidth on their cell sites to other carriers. Each cell site 212 has a known geographic location represented here as an (X, Y) coordinate pair. While most telephones are now mobile, static geographic assumptions still hold for most cell sites 212. Thus, although the NAI does not provide a static geographic location, a cell site 212 does have a static geographic location. In a densely populated urban area, cell towers may sit within a few hundred meters of one another, while in sparsely populated rural areas, they may sit tens of miles apart. Generally, mobile phone 208 will attempt to lock on to the cell site 212 with the strongest signal, which in most cases is the nearest cell site, or alternatively a nearby site with few obstructions.

Thus, while identifying an (X, Y) coordinate of a cell site 212 that handles a call does not provide a geographic location of mobile phone 208 with the kind of precision that GPS does, it does provide a good gross location, generally accurate within at most a few miles. For purposes of 988 routing, accuracy within a few miles is generally sufficient.

The 988 call is routed via carrier infrastructure 216 through the Internet 228. The carrier provides a cell ID, such as in this example and ID for cell site 212-2. This cell ID may be provided to a GMLC 225, which provides a gross geographic location for mobile phone 208 according to the teachings of the present specification.

GMLC 225 provides this approximate location to routing service 220, for example in the form of a G-ANI. The G-ANI is not intended to be the actual phone number assigned to mobile phone 208 (for example, here illustrated as 311-555-1010). Rather, the G-ANI is intended to correlate to a phone number that might be found within a rate center that contains cell site 212-2. Thus, if caller 204 is roaming outside of his normal geographic area, or has moved since acquiring the phone number, and is calling from downtown Seattle, Washington, the G-ANI may have a 425 area code, a prefix that belongs to a rate center or wire center that contains cell site 212-2, and a line number selected from within the prefix. The line number may be a first line number available from the exchange, a randomly generated line number, or some other fixed line number. For example, while the ANI for mobile phone 208 is 311-555-1010, the G-ANI assigned to the call based on cell site 212-2 might be, for example, 425-303-0000. This G-ANI may be provided to routing service 220 to provide an approximate location of cell site 212-2, which may be assumed to correlate to an approximate location of mobile phone 208 and caller 204.

Using in-place legacy infrastructure, routing service 220 may query a local exchange routing guide 117 (FIG. 1) and wire center boundaries DB 118 (FIG. 1) to determine a best available call center to handle the 988 call. Based on this query, routing service 220 may convert the call to an 800 number for local call center 224, and forward the call to local call center 224 so that mental health professionals can handle the call with appropriate local knowledge.

Figure 3A:
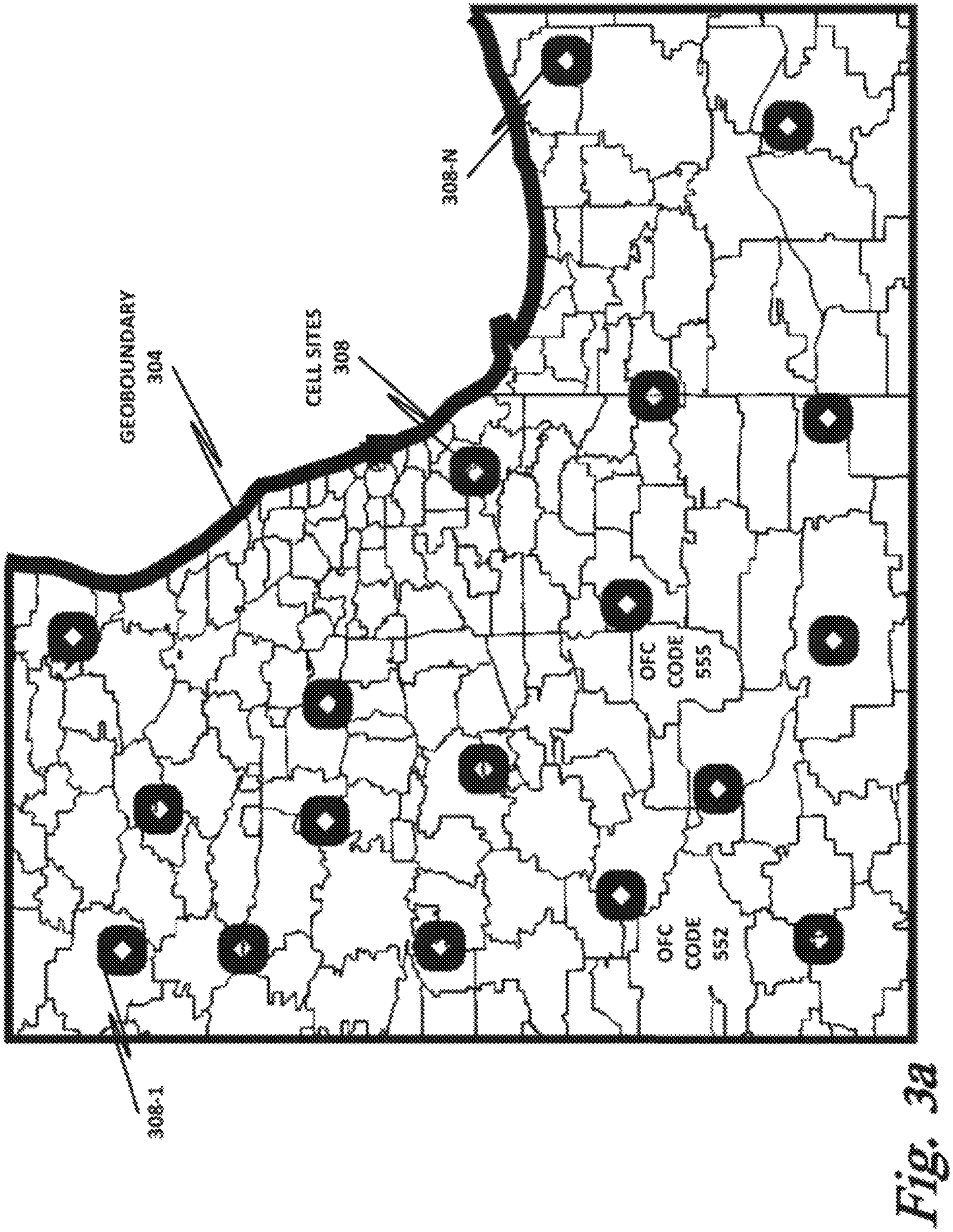
FIG. 3*a* is an illustration of a geoboundary.

FIG. 3*a* is a block diagram illustration of a geoboundary 304, which may correspond for example to a wire center or rate center within a carrier network. Geoboundary 304 includes a number of cell sites 308, which depending on the population density may be a large number of cell sites. Cell sites 308 are illustrated here as sites 308-1 through 308-N to illustrate the plurality of sites.

Geoboundary 304 may also include a number of exchanges or central offices that provide different prefixes or office codes. Within this illustration, the smaller sub boundaries within geoboundary 304 may represent different office codes. For example office codes 555 and 552 are illustrated to represent the plurality of office codes.

When a GMLC is selecting a G-ANI, it may select one of the available office codes within geoboundary 304. Within those office codes, it may select an appropriate line number to affix to the G-ANI.

Throughout the United States, most geoboundaries 304 will be associated with a single NPA code or area code. However, this is not always the case. For example, within Seattle, WA, area codes 425 and 206 are both used. Thus in some cases, area codes may overlap within geoboundary 304. In cases where two or more area codes overlap within geoboundary 304, the GMLC may either prefer one area code over the other, or randomly select one of the available area codes.

Figure 3B:
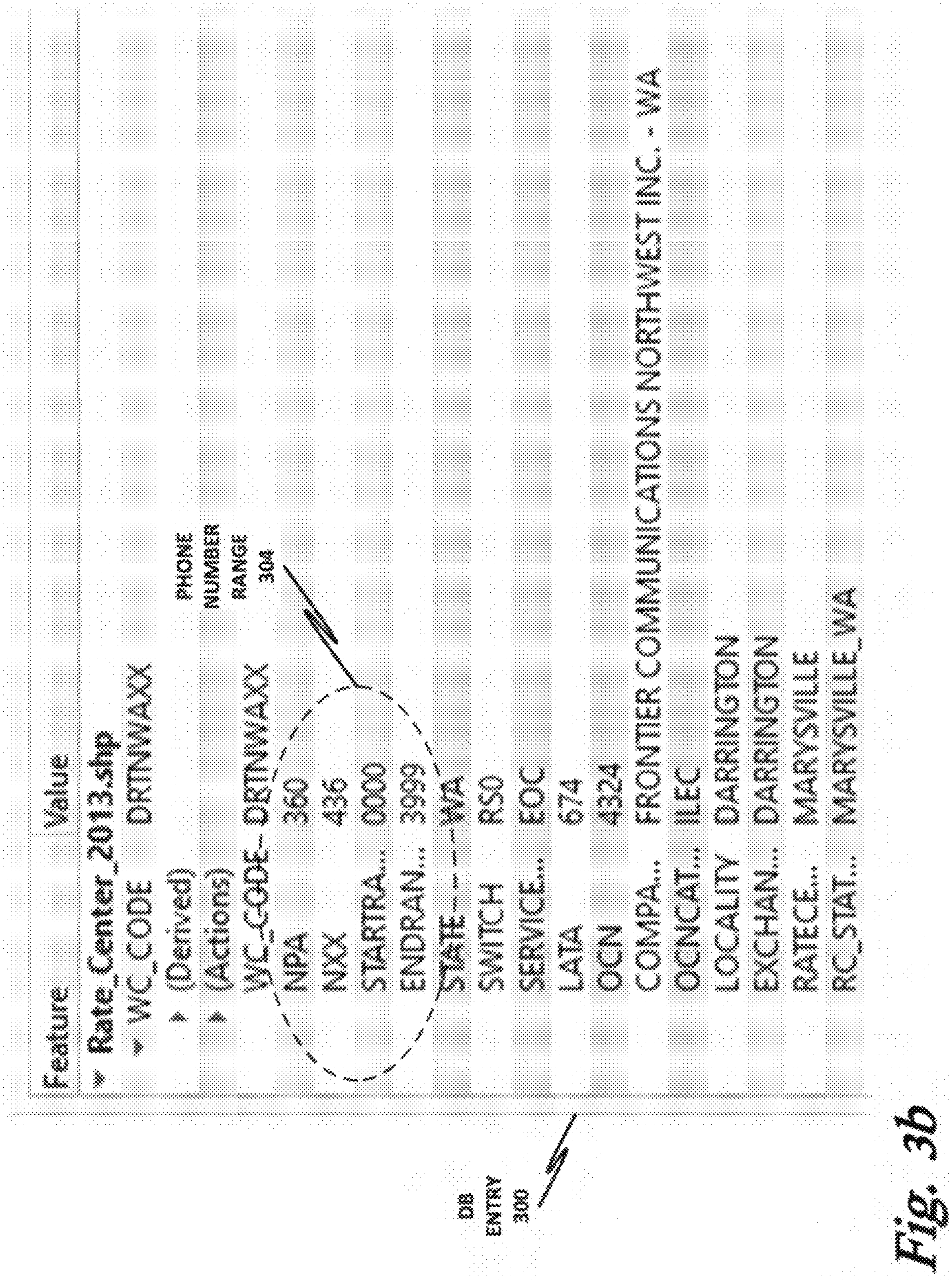
FIG. 3*b* is an illustration of a database entry related to a geoboundary.

FIG. 3*b* illustrates a database entry 300 that may be associated with a particular rate center. In this case, the database entry 300 includes a phone number range 304. This includes an NPA 360, and NXX 436 (representing the telephone exchange), and starting and ending line numbers. In this example, 4000 line numbers are available within the rate center, between 0000 and 3999. A neighboring rate center might have access to numbers in the range 360-436-4000 through 360-436-9999. In that case, where the GMLC uses the first available value within the rate center, it may use 4000 instead of 0000.

Figure 4:
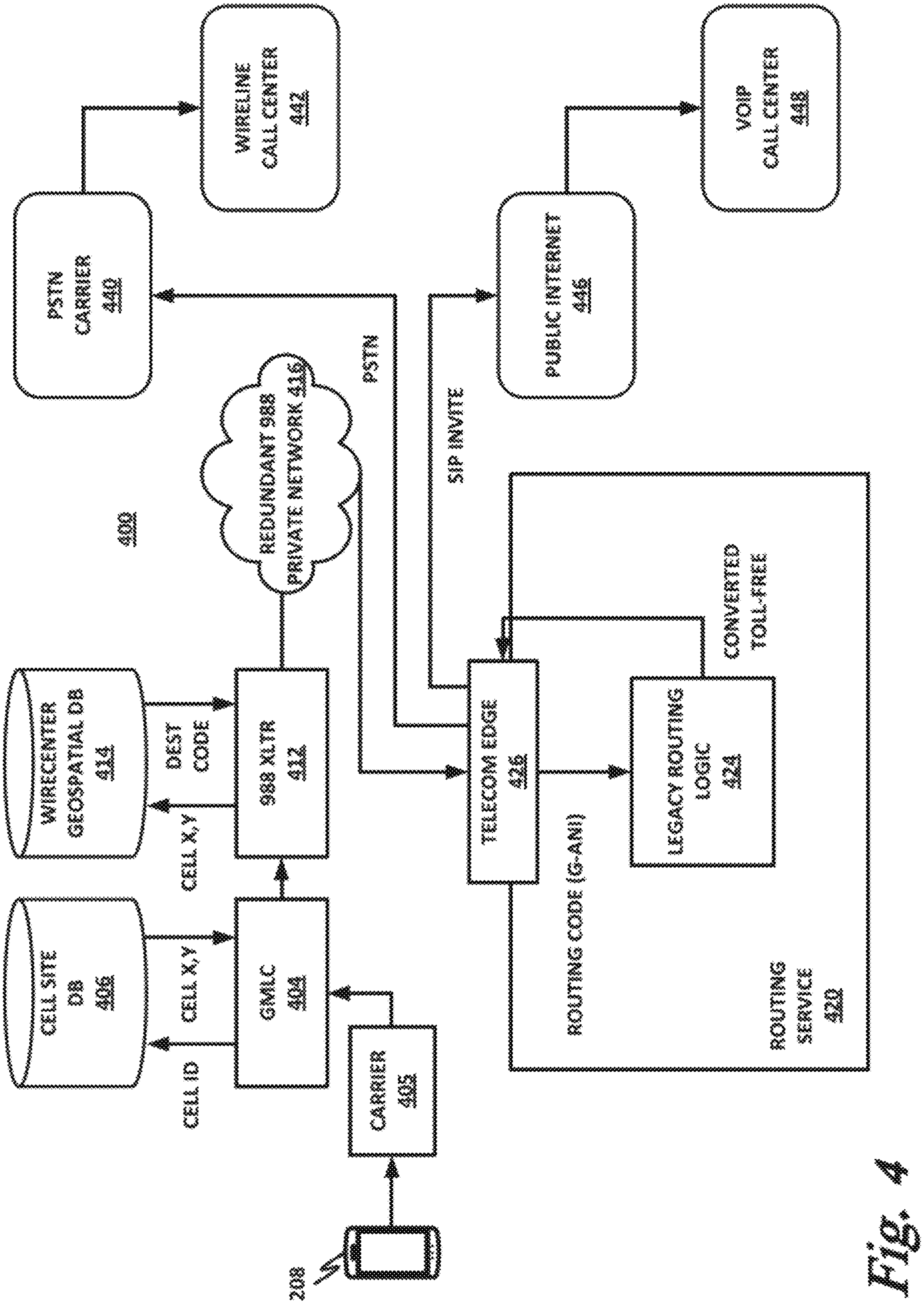
FIG. 4 is a block diagram illustration of selected elements of a 988 routing infrastructure.

FIG. 4 is a block diagram of selected elements of a call routing infrastructure 400. As illustrated in previous figures, a human user operates a cell phone 208 to request a service such as 988 service.

A carrier 405 receives and handles the call via a selected cell tower or cell site. Carrier 405 receives the ANI associated with cell phone 208, and also provides a cell ID for the cell site that received the call. Carrier 405 provides these data to GMLC 404.

GMLC 404 queries a cell site database 406 with the cell ID. In some cases, GMLC 404 may contract with carrier 405 to receive accurate cell site coordinates. However, because 988 calls are routed to the carrier that services the subscriber instead of to the carrier that owns the cell site, carrier 405 may not have accurate geographic coordinates for the cell site because the carrier that owns the cell site may protect such data as a trade secret. Thus, while carrier 405 may provide to GMLC 404 accurate geographic coordinates for its own cell sites, it may not be able to do so for the cell sites of other carriers. In some embodiments, cell site DB 406 may be or may be augmented with additional third-party services, such as for example a crowd-sourced cell site location database.

Cell site DB 406 returns to GMLC 404 (X, Y) coordinates for the given cell site. In the case of crowd sourced cell site data, the (X, Y) coordinates may not be accurate to full GPS resolution (which may be accurate on the scale of inches or decimeters). However, in the context of 988 routing, GPS scale resolution is not necessary. Thus a crowd sourced (X, Y) coordinate for the cell site with a resolution of meters may be sufficient for at least some embodiments.

GMLC 404 provides the cell (X, Y) coordinates to a 988 translator 412. 988 translator 412 queries a wire center geospatial database 414 with the cell site coordinates that GMLC 404 provided. Wire center geospatial DB 414 returns to 988 translator 412 a destination code, which may include an area code and prefix that correspond to a wire center or rate center that is believed to contain the cell site, and a line number selected from the available line numbers in the rate center. 988 translator 412 may build a SIP invitation 988-X header with the destination code, which may include a G-ANI as discussed herein. 988 translator 412 may provide the packet with the G-ANI to redundant 988 private network 416, which communicates to a telecom edge 426 into routing service 420.

Routing service 420 may include legacy routing logic 424, which is built to use the ANI as a proxy for a precise geographic location, and to route calls based on the ANI. For example, the legacy routing logic may be configured to find a 911 call center near the assumed geographic location of the caller, based on the ANI, and to provide that location to dispatch services. For a 911 call, dispatch services may dispatch emergency responders to that location.

With relatively minor modification, routing service 420 can modify legacy routing logic 424 to extract the routing code, including the G-ANI, and use the G-ANI to perform its routing function. Routing service 420 may convert the call into a toll-free call directed to a number such as an 800 number for a 988 service center.

Based on the call type, routing service 420 may route the call via PSTN to a PSTN carrier 440, which may then direct the call to a wireline call center 442. Alternatively, routing service 420 may forward a SIP invite via public internet 446 to a VOIP call center 448. In either case, the call center may provide the necessary counseling services to assist the caller.

Figure 5:
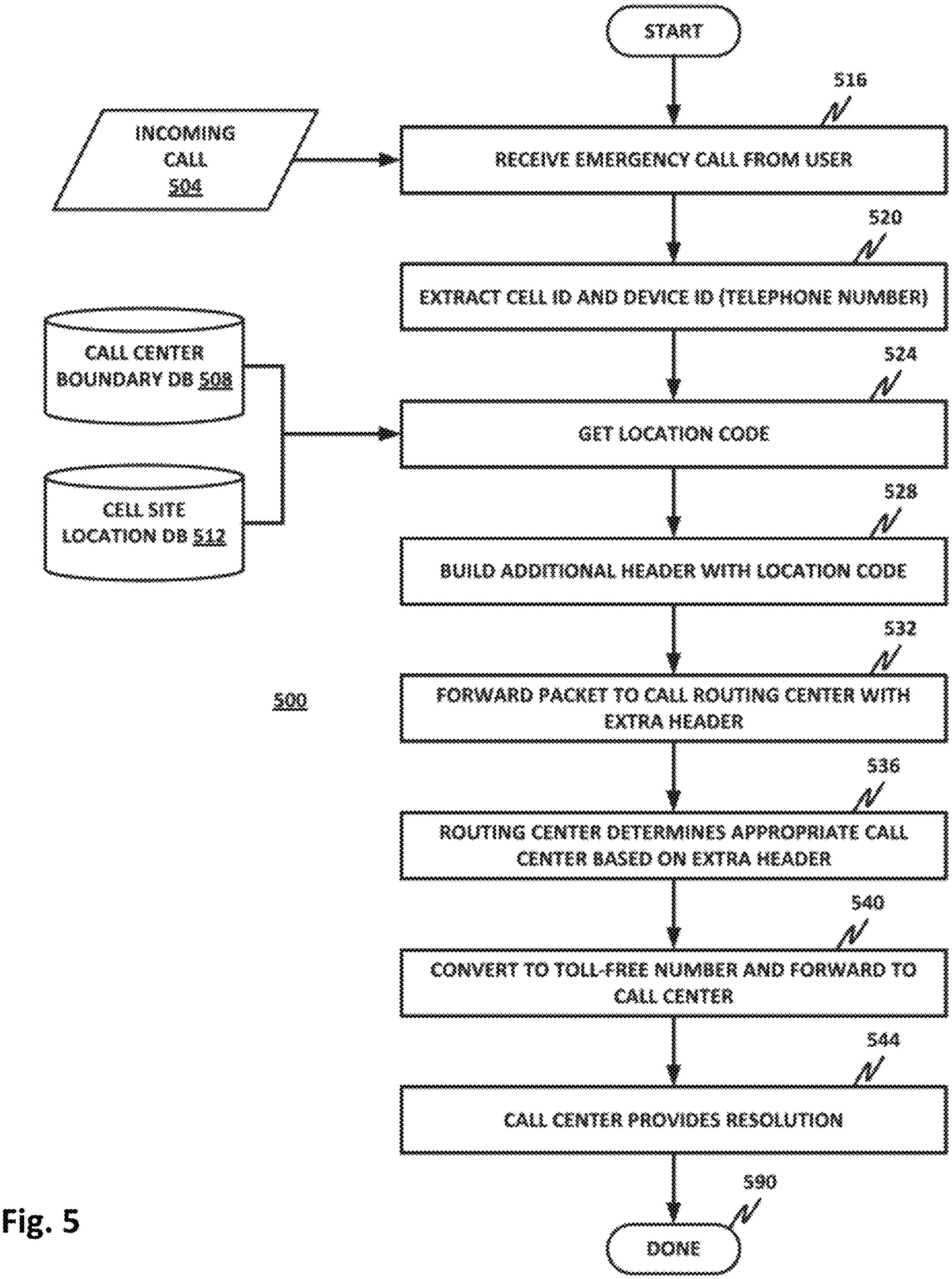
FIG. 5 is a flowchart illustrating selected elements of a method of routing 988 calls.

FIG. 5 is a flowchart of selected elements of a method 500 of routing 988 calls. Starting at block 516, the carrier receives an incoming call 504, which may be a time and location-sensitive call, such as for 988 services.

In block 520, the carrier may (as necessary) extract the cell ID and device ID, which may be a telephone number. Note, however, that in the context of a 988 call, it may be undesirable to forward detailed location information beyond the carrier.

In block 524, an appropriate entity such as the GMLC may query a call center boundary DB 508 and a cell site location DB 512 to get a location code for the call.

In block 528, the entity may build an additional header with the location code.

In block 532, the entity forwards the packet to a call routing center with the extra header. The call routing center may be a separate entity from the GMLC, or the same enterprise.

In block 536, the routing center may operate legacy infrastructure with minor modifications to determine the appropriate call center based on the extra header.

In block 540, the routing center converts the call to a toll-free number call and forwards it to an appropriate call center.

In block 544, the call center provides resolution for the call.

In block 590, the method is done.

Figure 6:
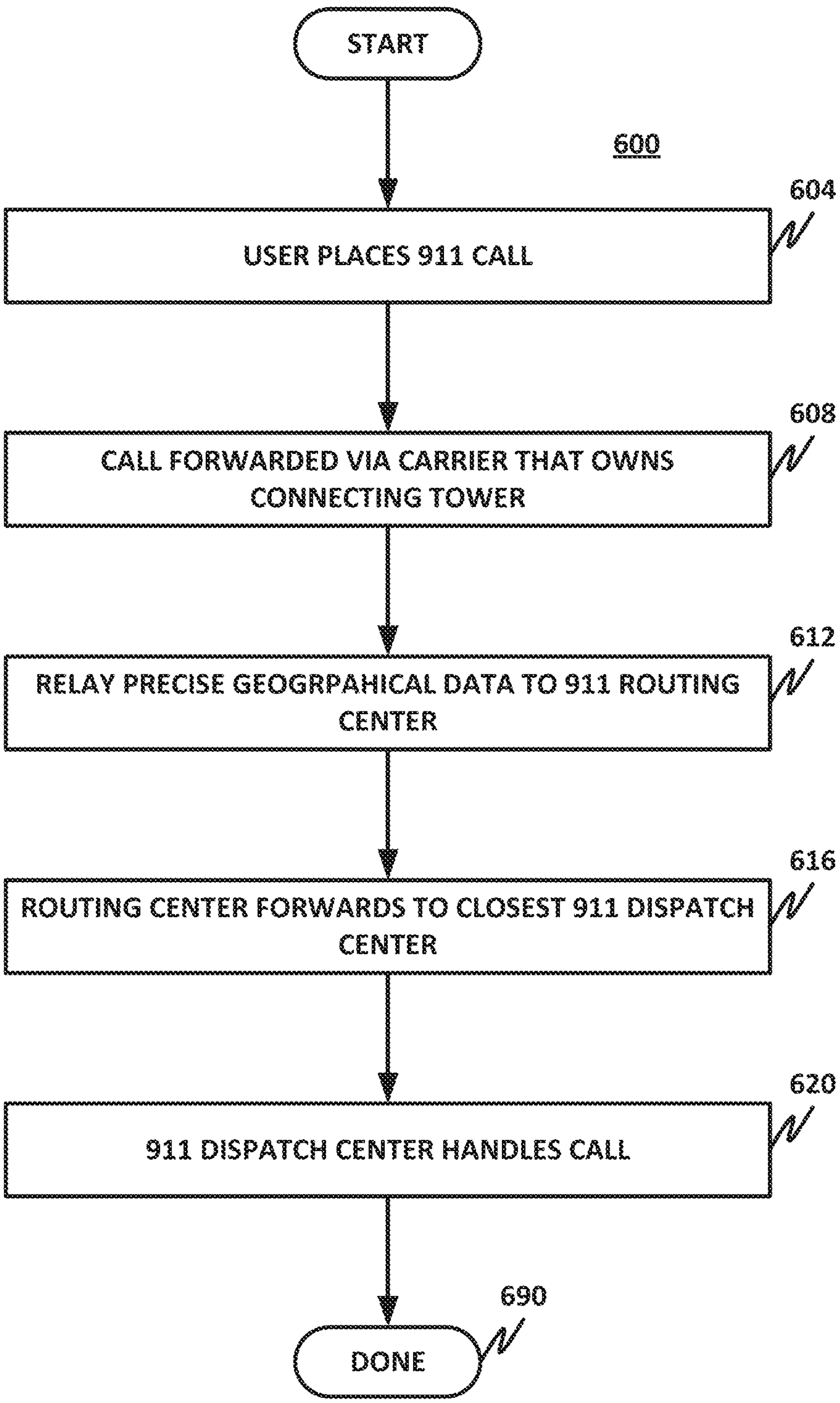
FIG. 6 is a flowchart illustrating selected elements of a method of routing 911 calls.

FIG. 6 is a flowchart of a method 600 of handling emergency calls such as 911 calls. In the case of 911 calls, it may be desirable or even statutorily required to provide more precise location information than is required for other call types. Method 600 may also benefit from using a G-ANI in appropriate circumstances.

In block 604, the user places a 911 call.

In block 608, the 911 call is forwarded via the carrier that owns the connecting tower. This is in contrast to the case of a 988 call, which is forwarded via the carrier that the calling user subscribes to.

In block 612, the system may relay precise geographical data to the 911 routing center. This precise geographical data may include, for example, GPS data. For example, in the case of 911, it may be permissible or even required for the cellular phone to share its GPS or location services with the 911 call. In the case of 988, this may be unnecessary and/or undesirable.

In block 616, the routing center identifies the closest (or most appropriate) 911 dispatch center to the geographic location of the user that made the call, and forwards the call to that 911 dispatch center.

In block 620, the 911 dispatch center handles the call. This may include dispatching emergency services to the exact or precise geographic location provided.

In block 690, the method is done.

Figure 7:
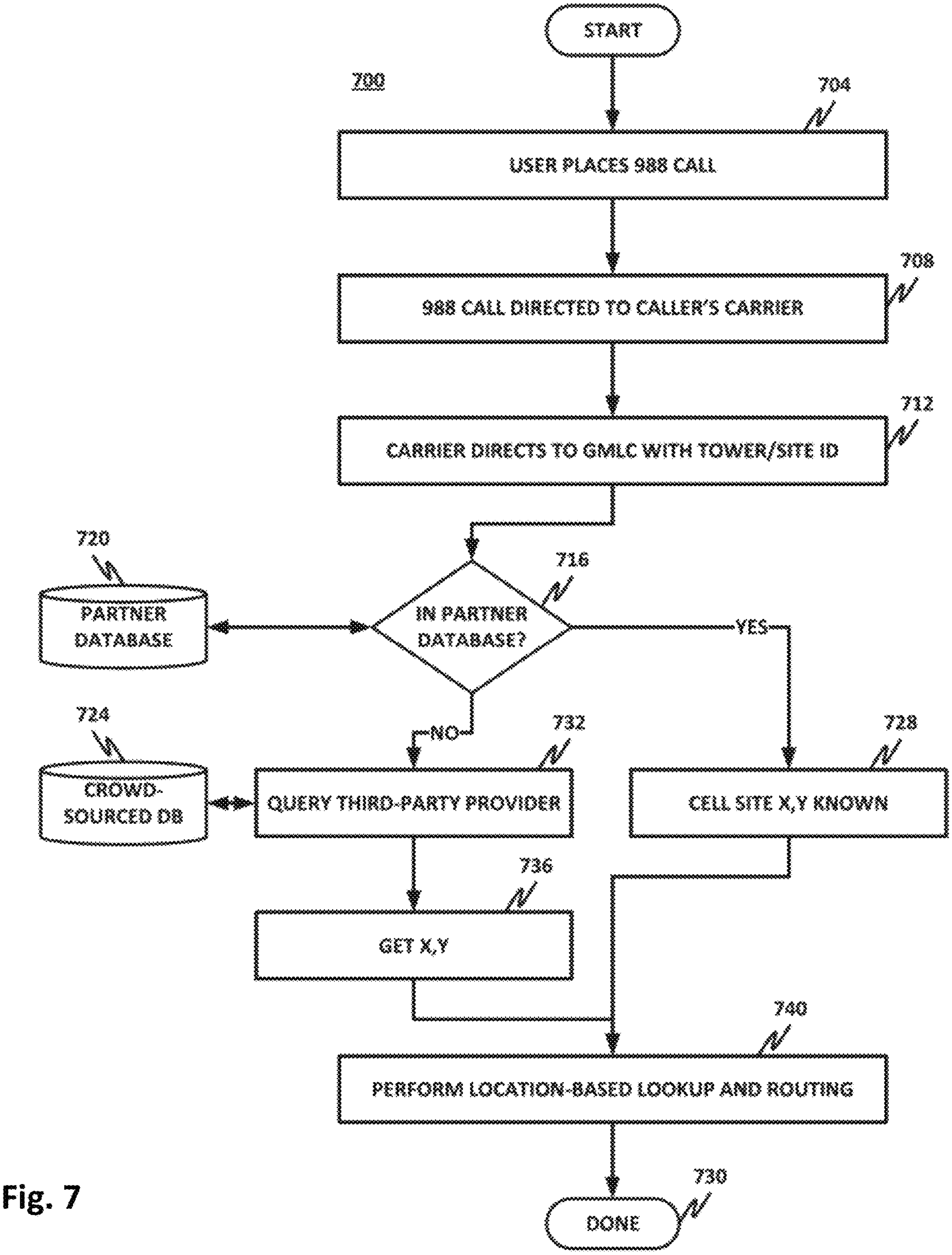
FIG. 7 is a flowchart illustrating selected elements of a method of assigning a routing number to a call.

FIG. 7 is a flowchart of selected elements of the method 700 of providing gross location routing in cases where the wireless carrier may not share precise location data with the GMLC.

In block 704, the user places a 988 call.

In block 708, the 988 call is directed to the caller's carrier, in contrast to a 911 call where the call is directed to the carrier that owns the cell site. This is a substantial distinction, because in the case of 911, the carrier that owns the cell site is generally expected to have a database of precise geographic locations of its own cell sites. Thus, if the present method is used with 911 calls, then it is expected that the carrier handling the call will always have precise geographic data for the cell site. But in the case of 988 calls, the carrier that receives the call may be in a completely different geographic region of the United States from the cell site, and may have no direct data on the cell site.

In block 712, the carrier directs the call to the GMLC, with the tower or site ID for the cell site handling the call.

In decision block 716, the GMLC determines whether the cell ID is in its partner database 720. The partner database 720 may include a database of cell sites of carriers with which the GMLC directly contracts. This may be fewer than all available carriers, and thus partner database 720 may not be a complete database of all cell sites throughout the United States.

If the cell site is in the partner database 720, then in block 728, the cell site (X, Y) coordinates are known with high precision. Thus, the GMLC may provide the correct cell site (X, Y) coordinates.

In block 740, the GMLC or another entity may perform appropriate location-based lookup and routing.

Returning to decision block 716, if the cell ID is not in partner database 720, then in block 732, the GMLC may query a third-party provider with a crowd sourced database 724. Crowd sourced database 724 may be compiled, for example, by users who connect to various cell sites and log their approximate geographic locations, based for example on signal strength and other properties that can be used to correlate a site ID with a physical cell tower.

In block 736, the third-party provider may return the cell site (X, Y) coordinates from crowd sourced database 724, which may have sufficient resolution for the purposes of 988 routing.

In block 740, the appropriate entity performs the location-based lookup, and routing based on the best available (X, Y) coordinates of the identified cell site, and proceeds as described elsewhere within the specification.

In block 730, the method is done.

Figure 8:
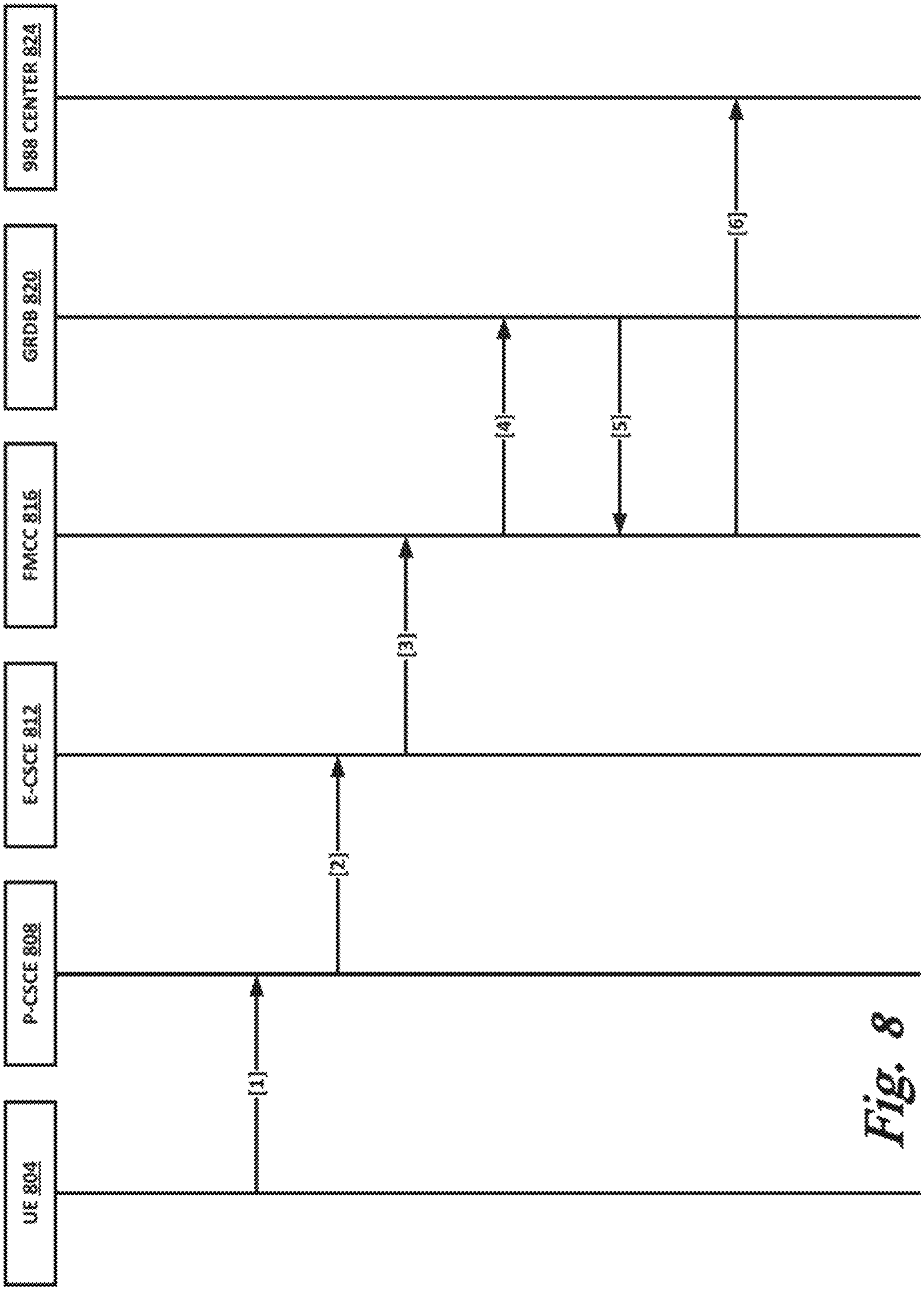
FIG. 8 is a signal flow diagram illustrating selected elements of routing a 988 call.

FIG. 8 is a signal flow diagram illustrating selected elements of handling of a 988 call. The signaling illustrated in FIG. 8 may also be adapted to other use cases.

In this example, a mobile subscriber operates UE 804 to place a 988 call. At signal [1], UE 804 sends a SIP invite is sent proxy call session control function (P-CSCE) 808. The SIP invite may include INVITE(988, MSISDN, Cell ID), where 988 indicates this is a 988 call, the MSISDN is mobile subscriber integrated services digital network identifier, and Cell ID is an identifier of the cell site or tower that is handling the call. Alternatively, a European corporate governance institute (ECGI) identifier may be used.

P-CSCE 808 may be configured to send the call to the existing emergency CSCF (E-CSCF) 812 with the ISDN of the call and Cell ID. Thus, P-CSCE may send signal [2] to emergency CSCE (E-CSCE) 812. Signal [2] may include INVITE(988, MSISDN, Cell ID).

E-CSCE 812 may send signal [3], the SIP invoice, to fixed mobile convergence controller (FMCC) 816, which may be for example a GMLC. Signal [3] may include INVITE(988, MSISDN, Cell ID). Signal [3] may pass through a session border controller (SBC) (not shown) en route to FMCC 816.

FMCC 816 receives the 988 SIP Invite and sees that it has a Cell ID (or possibly a presence information data format location object (PIDF-LO) and an MSISDN. Using the cell ID, it queries its internal tables, represented here as geospatial relationship database 820, sending signal [4] as XY Lookup(Cell X,Y). This may be a request to GRDB 820 to provide the known x,y location (e.g., approximate coordinates) of the identified cell site. FMCC 816 finds the x,y location for that cell ID. Alternately, the carrier could push the location of the cell in a PIDF-LO message in the SIP invite.

In some cases, the GMLC provider may have a contractual relationship with only some wireless carriers, wherein the wireless carriers provide access to their cell site location data. Absent such a contract, current practice is for most wireless carriers to protect cell site location data as trade secrets. However, these data can be inferred with sufficient effort, such as by connecting to cell towers and observing their cell IDs, then logging the approximate geographic location of those cell towers. Such third-party databases may be less precise than carrier-sourced data, but less precise data may be adequate for the purposes of the present disclosure. Thus, GRDB 820 may provide sufficiently-accurate cell site location data even for cell sites that do not contract with FMCC 816. This may be valuable because, unlike 911 calls, 988 calls are not routed via the carrier of the cell tower that connects the call, but rather via the subscriber's carrier. Thus, if the subscriber's carrier contracts with the GMLC provider, there may be cases where a call connects via another carrier's cell site, in which case it may still be desirable to connect the caller to the appropriate call center.

In response to the XY Lookup, GRDB 820 looks up the cell site coordinates in its database for the layer requested and returns a routing identifier. This routing identifier could be a PSTN number for a destination 988 center, or it may be a G-ANI in the form of a ten-digit telephone number that will be used by the 988 center to perform its legacy routing on, instead of the real ANI (MSISDN). GRDB 820 may return to FMCC 816 signal [5], an XY Response, which may include a routing code, including for example a G-ANI that has been generated for the call.

FMCC 816 may convert the call to a toll-free number such as a 1-800 number, with routing to the correct 988 call center, and may also generate an X-header. FMCC 816 may place the G-ANI into the X-988 field of the SIP invite, which may also include the MISISDN and destination 988 network (such as 1-800-273-TALK). FMCC 816 provides signal [6] to 988 Call center 824, which may include INVITE(To: 988 #, From: MSISDN, X-988 999[G-ANI]).

Figure 9:
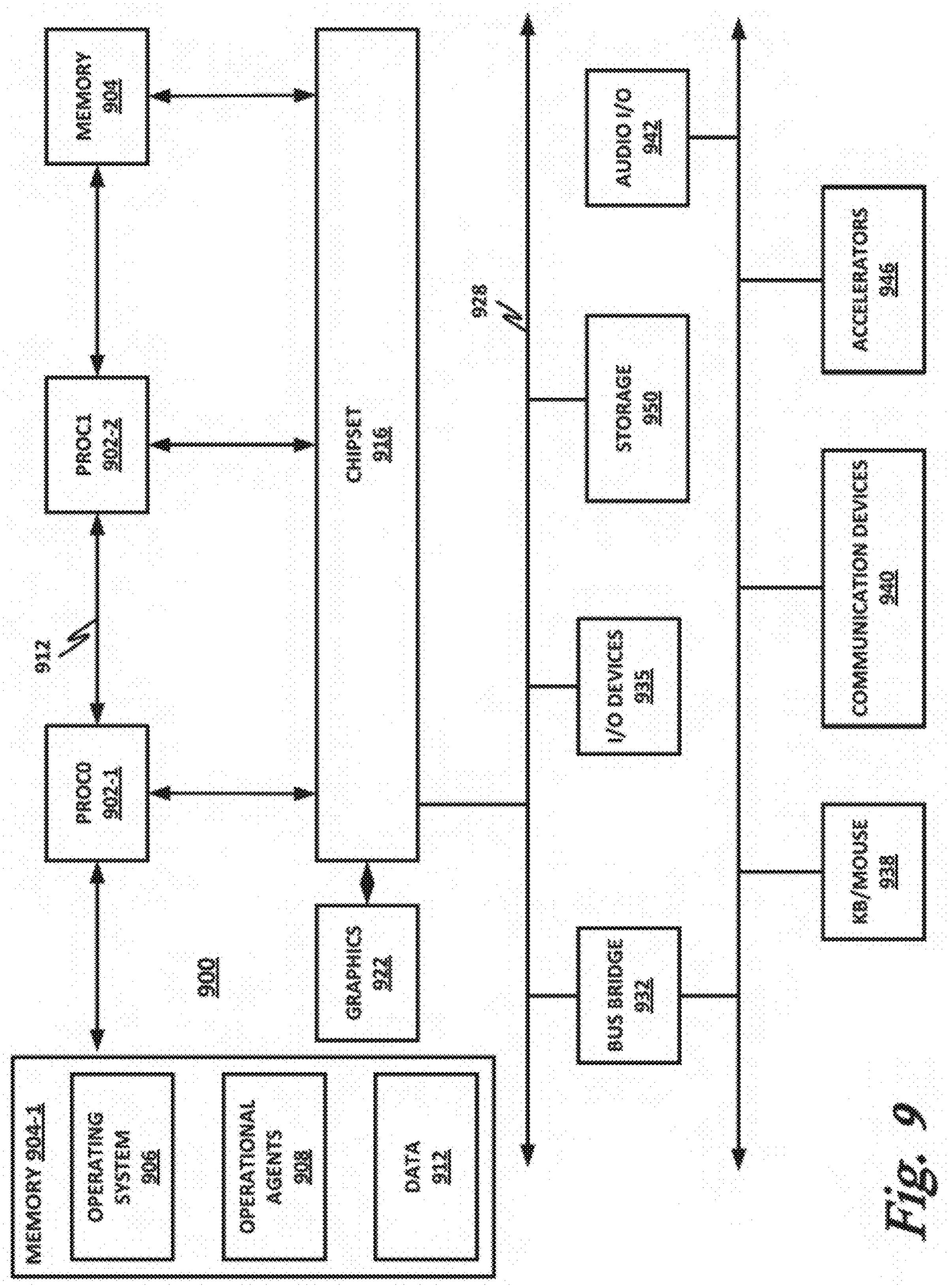
FIG. 9 is a block diagram of selected elements of a hardware platform.

FIG. 9 is a block diagram of a hardware platform 900. This specification provides various functions and modules related to 988 call routing that may be realized on an apparatus such as a computing system. Hardware platform 900 provides an illustrative architecture for those systems and functions. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more central processor units (CPU).

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, a data storage device 944, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more nontransitory computer-readable mediums having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QuickPath Interconnect, QPI, or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor (s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 10:
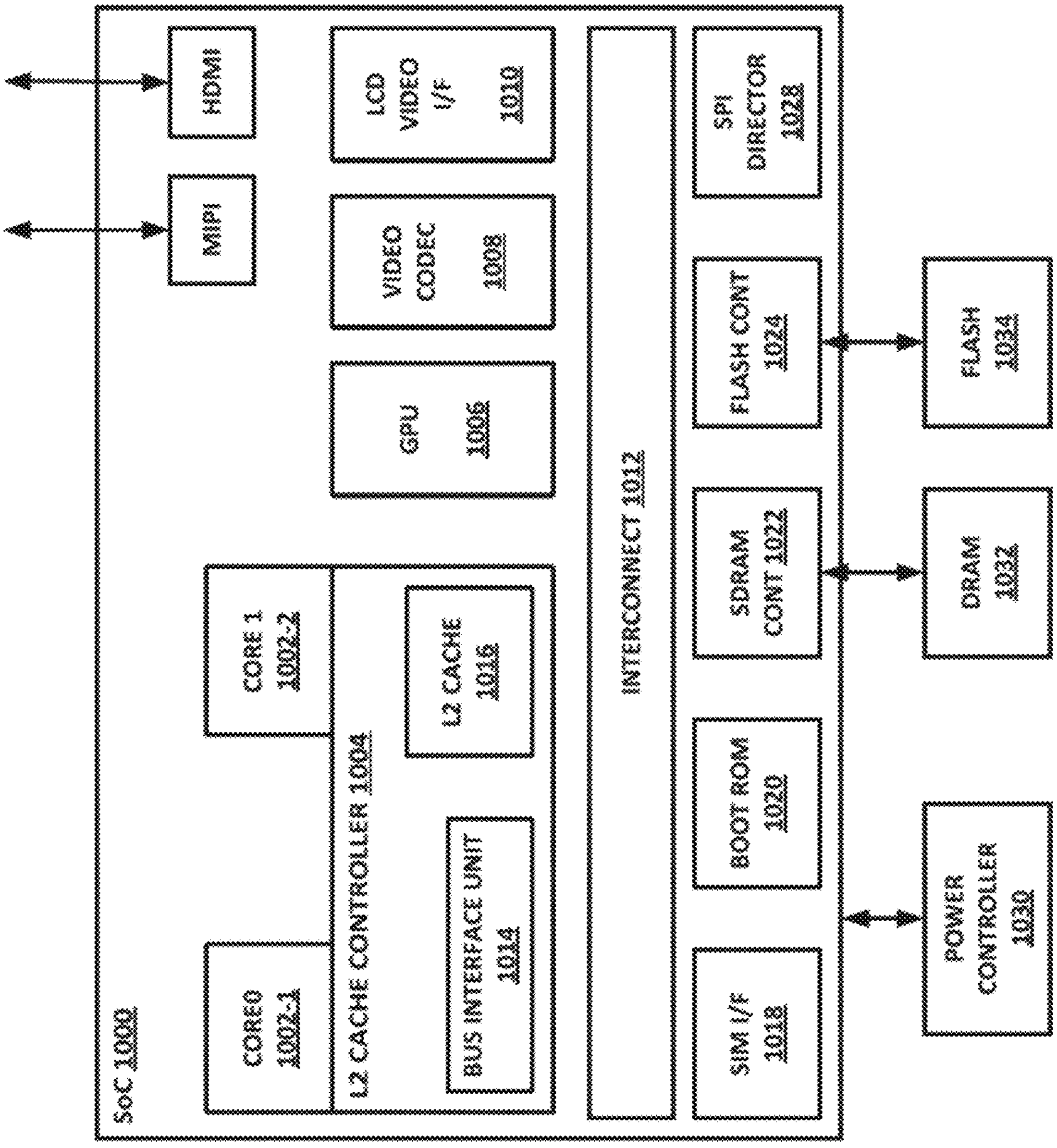
FIG. 10 is a block diagram of selected elements of a system-on-a-chip (SoC).

FIG. 10 is a block illustrating selected elements of an example SoC 1000. At least some of the teachings of the present specification may be embodied on an SoC 1000, or may be paired with an SoC 1000. For example, accelerated functions or data center functions are commonly realized on an SoC.

SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) director 1028, a suitable power control 1030, a dynamic RAM (DRAM) 1032, and flash 1034. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1000 (or other integrated circuits) may use intellectual property blocks (IP blocks) to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 11:
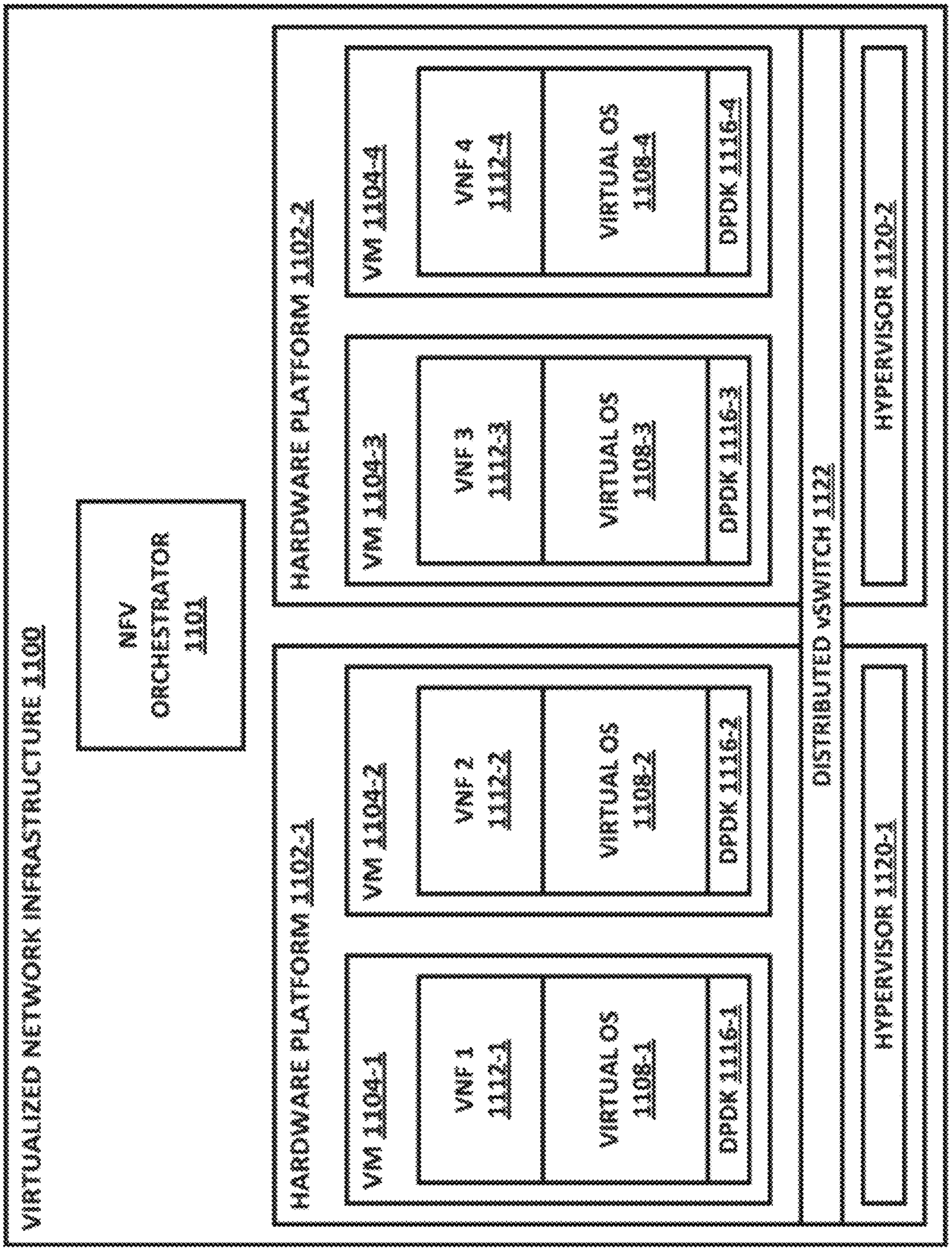
FIG. 11 is a block diagram of selected elements of a network function virtualization (NFV) infrastructure.

FIG. 11 is a block diagram of a NFV infrastructure 1100. NFV is an example of virtualization, and the virtualization infrastructure here can also be used to realize traditional VMs. Various functions described above may be realized as VMs. In particular, a number of telecommunication functions, databases, and modules are illustrated in relation to 988 call routing. Any of these may be realized on a VM.

NFV is generally considered distinct from software defined networking (SDN), but they can interoperate together, and the teachings of this specification should also be understood to apply to SDN in appropriate circumstances. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 may manage several VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform 1102 may include a respective hypervisor 1120, virtual machine manager (VMM), or similar function, which may include and run on a native (bare metal) operating system, which may be minimal so as to consume very few resources. For example, hardware platform 1102-1 has hypervisor 1120-1, and hardware platform 1102-2 has hypervisor 1120-2.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are VMs 1104, each of which in this example is a VNF providing a virtual service appliance. Each VM 1104 in this example includes an instance of the Data Plane Development Kit (DPDK) 1116, a virtual operating system 1108, and an application providing the VNF 1112. For example, VM 1104-1 has virtual OS 1108-1, DPDK 1116-1, and VNF 1112-1. VM 1104-2 has virtual OS 1108-2, DPDK 1116-2, and VNF 1112-2. VM 1104-3 has virtual OS 1108-3, DPDK 1116-3, and VNF 1112-3. VM 1104-4 has virtual OS 1108-4, DPDK 1116-4, and VNF 1112-4.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., a host fabric interface (HFI)). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
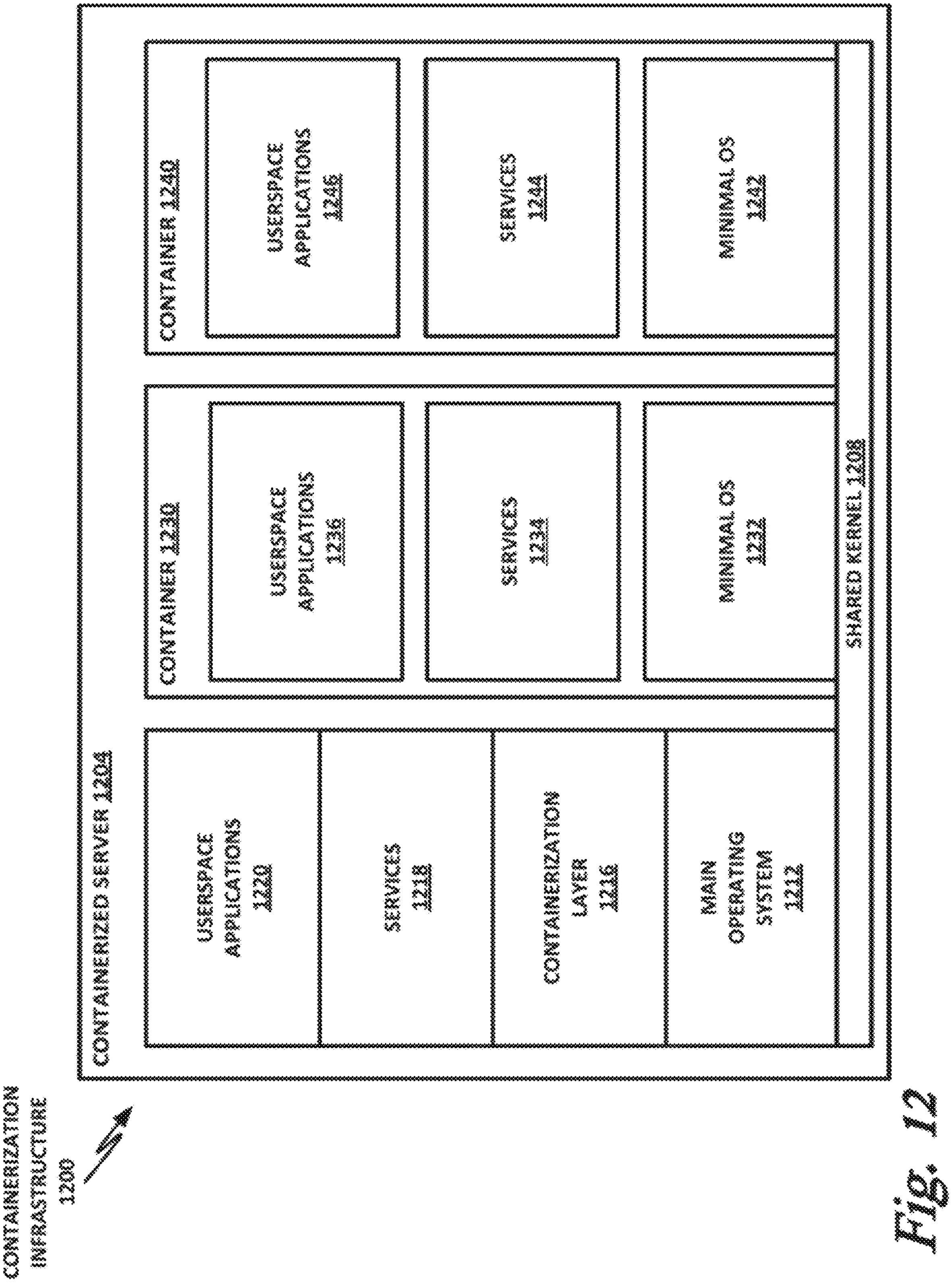
FIG. 12 is a block diagram of selected elements of a containerization infrastructure.

FIG. 12 is a block diagram of selected elements of a containerization infrastructure 1200. Like virtualization, containerization is a popular form of providing a guest infrastructure. Various functions described herein may be containerized. In particular, a number of telecommunication functions, databases, and modules are illustrated in relation to 988 call routing. Any of these may be realized in a container.

Containerization infrastructure 1200 runs on a hardware platform such as containerized server 1204. Containerized server 1204 may provide processors, memory, one or more network interfaces, accelerators, and/or other hardware resources.

Running on containerized server 1204 is a shared kernel 1208. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1208 is main operating system 1212. Commonly, main operating system 1212 is a Unix or Linux-based operating system, although containerization infrastructure is also available for other types of systems, including Microsoft Windows systems and Macintosh systems. Running on top of main operating system 1212 is a containerization layer 1216. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer (e.g., Docker) versus one without a daemon (e.g., Podman). Such debates are outside the scope of the present specification, and when the present specification speaks of containerization, it is intended to include any containerization layer, whether it requires the use of a daemon or not.

Main operating system 1212 may also provide services 1218, which provide services and interprocess communication to userspace applications 1220.

Services 1218 and userspace applications 1220 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1212, they inherit the same file and resource access permissions as those provided by shared kernel 1208. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1204, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1204).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors-especially type 1, or "bare metal," hypervisors-provide such near-native performance that this advantage may not always be realized.

In this example, containerized server 1204 hosts two containers, namely container 1230 and container 1240.

Container 1230 may include a minimal operating system 1232 that runs on top of shared kernel 1208. Note that a minimal operating system is provided as an illustrative example, and is not mandatory. In fact, container 1230 may perform as full an operating system as is necessary or desirable. Minimal operating system 1232 is used here as an example simply to illustrate that in common practice, the minimal operating system necessary to support the function of the container (which in common practice, is a single or monolithic function) is provided.

On top of minimal operating system 1232, container 1230 may provide one or more services 1234. Finally, on top of services 1234, container 1230 may also provide userspace applications 1236, as necessary.

Container 1240 may include a minimal operating system 1242 that runs on top of shared kernel 1208. Note that a minimal operating system is provided as an illustrative example, and is not mandatory. In fact, container 1240 may perform as full an operating system as is necessary or desirable. Minimal operating system 1242 is used here as an example simply to illustrate that in common practice, the minimal operating system necessary to support the function of the container (which in common practice, is a single or monolithic function) is provided.

On top of minimal operating system 1242, container 1240 may provide one or more services 1244. Finally, on top of services 1244, container 1240 may also provide userspace applications 1246, as necessary.

Using containerization layer 1216, containerized server 1204 may run discrete containers, each one providing the minimal operating system and/or services necessary to provide a particular function. For example, containerized server 1204 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The foregoing detailed description sets forth examples of apparatuses, methods, and systems relating to a system for 988 routing accordance with one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to an embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random-access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is not intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected elements. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method of routing a sensitive communication, comprising:
  - receiving an incoming sensitive communication from a mobile device, the incoming sensitive communication connected via a mobile communication site;
  - determining an approximate or exact geographic location of the mobile communication site;
  - identifying a geographical telephone boundary that contains geographic location of the mobile communication site;
  - selecting a numbering plan area (NPA) and prefix associated with the geographical telephone boundary;
  - based on the selecting, assigning, to the sensitive communication, a North American Numbering Plan (NANP) telephone number with an NPA and prefix that match the selected NPA and prefix, wherein the NANP telephone number is different from a telephone number of the mobile device;
  - attaching the assigned NANP telephone number to a network packet; and forwarding the network packet to a service center to handle the sensitive communication.

2. The computer-implemented method of claim 1, wherein the mobile communication site is a cellular telephone site.

3. The computer-implemented method of claim 1, wherein the geographic telephone boundary comprises a rate center.

4. The computer-implemented method of claim 1, wherein determining an approximate or exact geographic location of the mobile communication site comprises querying a crowd-sourced or third-party database of mobile communication site locations.

5. The computer-implemented method of claim 1, wherein the geographic telephone boundary comprises a legacy wire center for a public switched telephone network (PSTN).

6. The computer-implemented method of claim 1, wherein selecting the prefix comprises selecting the prefix from a plurality of prefixes of the geographical telephone boundary.

7. The computer-implemented method of claim 1, wherein selecting the prefix comprises selecting a prefix of a nearest telephone exchange to the mobile communication site.

8. The computer-implemented method of claim 1, wherein selecting the prefix comprises selecting a random prefix from a plurality of prefixes of the geographical telephone boundary.

9. The computer-implemented method of claim 1, wherein selecting the NPA comprises selecting an area code from at least two area codes for the geographical telephone boundary.

10. The computer-implemented method of claim 1, wherein assigning the NANP telephone number comprises assigning a random line number with the selected NPA and prefix.

11. The computer-implemented method of claim 1, wherein assigning the NANP telephone number comprises assigning a reserved line number with the selected NPA and prefix.

12. The computer-implemented method of claim 1, wherein assigning the NANP telephone number comprises assigning a fixed line number with the selected NPA and prefix.

13. The computer-implemented method of claim 12, wherein the fixed line number is a first line number in a range assigned to the geographical telephone boundary for the selected NPA and prefix.

14. The computer-implemented method of claim 1, wherein the sensitive communication is a call to a suicide crisis hotline or a 988 call.

15. The computer-implemented method of claim 1, further comprising attaching the assigned NANP telephone number to an extra header of the network packet.

16. The computer-implemented method of claim 1, further comprising attaching an actual NANP telephone number assigned to the mobile device to the network packet.

17. One or more tangible, nontransitory computer-readable storage media having stored thereon executable instructions to instruct a processor to:
  - receive an incoming sensitive communication from a mobile device, the incoming sensitive communication connected via a mobile communication site;
  - determine an approximate or exact geographic location of the mobile communication site;
  - identify a geographical telephone boundary that contains geographic location of the mobile communication site;
  - select a numbering plan area (NPA) and prefix associated with the geographical telephone boundary;
  - based on the selection, assign, to the sensitive communication, a North American Numbering Plan (NANP) telephone number with an NPA and prefix that match the selected NPA and prefix, wherein the NANP telephone number is different from a telephone number of the mobile device;
  - attach the assigned NANP telephone number to a network packet; and
  - forward the network packet to a service center to handle the sensitive communication.

18. The one or more tangible, nontransitory computer-readable storage media of claim 17, wherein the mobile communication site is a cellular telephone site.

19. A gateway mobile location center (GMLC) apparatus, comprising:
  - a hardware platform, comprising a processor circuit and a memory; and
  - instructions encoded within the memory to instruct the processor circuit to:
    - receive an incoming sensitive communication from a mobile device, the incoming sensitive communication connected via a mobile communication site;
    - determine an approximate or exact geographic location of the mobile communication site;
    - identify a geographical telephone boundary that contains geographic location of the mobile communication site;
    - select a numbering plan area (NPA) and prefix associated with the geographical telephone boundary;
    - based on the selection, assign, to the sensitive communication, a North American Numbering Plan (NANP) telephone number with an NPA and prefix that match the selected NPA and prefix, wherein the NANP telephone number is different from a telephone number of the mobile device;
    - attach the assigned NANP telephone number to a network packet; and forward the network packet to a service center to handle the sensitive communication.

20. The GMLC apparatus of claim 19, wherein the mobile communication site is a cellular telephone site.

* * * * *